(12) United States Patent
Ohno et al.

(10) Patent No.: US 6,522,442 B2
(45) Date of Patent: Feb. 18, 2003

(54) OPTICAL PATH STRUCTURE OF OPTICAL SCANNER ASSEMBLY

(75) Inventors: Mitsuhiro Ohno, Saitama (JP); Tetsuya Ori, Saitama (JP); Toshio Yamanaka, Yao (JP); Ayumu Oda, Nara (JP)

(73) Assignees: Fuji Photo Optical Co., Ltd., Saitama-ken (JP); Sharp Kabushiki Kaisha, Osaka-hu (JP)

( * ) Notice: Subject to any disclaimer, the term of this patent is extended or adjusted under 35 U.S.C. 154(b) by 0 days.

(21) Appl. No.: 10/083,946

(22) Filed: Feb. 27, 2002

(65) Prior Publication Data

US 2002/0145788 A1 Oct. 10, 2002

(30) Foreign Application Priority Data

Mar. 6, 2001 (JP) ........................................ 2001-061784

(51) Int. Cl.$^7$ ................................................ G02B 26/08
(52) U.S. Cl. ...................... 359/204; 359/206; 359/216
(58) Field of Search ................................ 359/204–207, 359/212–219; 347/241–244

(56) References Cited

U.S. PATENT DOCUMENTS 5,251,055 A * 10/1993 Koide .......................... 359/216
5,751,462 A * 5/1998 Shiraishi et al. ............ 359/204

FOREIGN PATENT DOCUMENTS

| JP | 06286226 | 4/1993 |
| JP | 10020608 | 7/1996 |
| JP | 10133131 | 11/1996 |
| JP | 11295625 | 4/1998 |

OTHER PUBLICATIONS

U.S. Application No. 09/725,600, filed Nov. 29, 2000, entitled Optical Scanner Assembly.
U.S. Application No. 09/725,831, filed Nov. 29, 2000, entitled Optical Scanner Assembly.
U.S. Application No. 10/106,180, filed Mar. 26, 2002, entitled Support Structure for Reflectors on Half Rate Carriage.

* cited by examiner

*Primary Examiner*—James Phan
(74) *Attorney, Agent, or Firm*—Price, Heneveld, Cooper, DeWitt & Litton

(57) ABSTRACT

An optical scanner assembly in which a pair of Fθ lenses are arranged symmetrically across a single deflector means and a reflector for introducing a light beam from at least one of a plurality of light sources to the deflector means is arranged on the side opposite to that light source with respect to an axis of symmetry of the Fθ lenses so that the optical path up to the reflector crosses the axis of symmetry, thereby securing the optical path length from the light source to the deflector for the miniaturization of the optical scanner assembly and allowing easy adjustment for equalizing the optical path lengths of all the light sources.

15 Claims, 8 Drawing Sheets

OPTICAL PATH STRUCTURE OF OPTICAL SCANNER ASSEMBLY

BACKGROUND OF THE INVENTION

1. Field of the Invention

The invention relates to an optical scanner assembly suited to an imaging systems for irradiating a plurality of image carriers such as photosensitive drums with a laser beam individually to form electrostatic latent images of identical or different colors on the respective image carriers, and successively transferring toner images formed from these electrostatic latent images while moving a transfer medium such as a sheet of recording paper, thereby forming a desired image on the transfer medium. In particular, the invention relates to an optical path structure extending from light sources to deflector means such as a polygon mirror.

2. Description of the Related Art

Tandem imaging systems are widely known as the color-imaging systems for use in the color copiers or the color printers. This imaging system employs a method of arranging a plurality of image carriers such as photosensitive drums in tandem, irradiating each of these image carriers with a laser beam under write scan to form electrostatic latent images, developing these electrostatic latent images with predetermined toners to form toner images, and successively transferring the toner images to a transfer medium such as a sheet of recording paper which is moved in the tandem direction of the image carriers to form a color image.

Among the typical imaging systems of this kind is an optical scanner system that appears in Japanese Patent Laid-Open Publication No. Hei 11-295625. Such a typical tandem imaging system is configured to form electrostatic latent images by exposing its four photosensitive drums to the laser beams emitted from four laser light sources corresponding to image data of Y (yellow), M (magenta), C (cyan), and BK (black) through corresponding optical scanner systems, respectively.

In this color imaging system, the plurality of photosensitive drums are provided with their respective optical scanner systems, which can hinder the miniaturization of the apparatus and result in higher cost. On this account, Japanese Patent Laid-Open Publications No. Hei 6-286226, 10-20608, 10-133131, and others have disclosed color imaging systems having a single optical scanner system common to a plurality of photosensitive drums to achieve the miniaturization of the system. The optical scanner assemblies used in these color imaging systems are configured so that a plurality of laser light sources consistent with the number of photosensitive bodies emit laser beams, deflector means for common deflection deflects the laser beams to splitter means, and the splitter means introduces the laser beams to the respective photosensitive bodies.

To form clearer latent images on the image carriers, the optical member introducing the laser beams to the image carriers must need to exhibit desired optical performance. In particular, the optical paths extending from the laser light source to the deflector means contain collimator lenses and cylindrical lenses, which carry out an adjustment to the laser beams. In order for these optical members to have the desired optical performance, appropriate lengths are required of the optical paths. For example, a laser beam passed through a cylindrical lens must be incident on the deflector means with proper convergence. This convergence necessitates an optical path of appropriate length.

For the sake of commonality of the optical members regarding the four laser beams emitted from the four laser light sources, the optical path lengths from the cylindrical lenses to the image carriers are desirably equal.

Also, conventional optical scanner assemblies have their cylindrical lenses spaced away from the polygon mirror. Thus, securing optical paths of appropriate lengths hinders the miniaturization of the optical scanner assemblies.

SUMMARY OF THE INVENTION

In view of the foregoing, an object of this invention is to provide an optical path structure for an optical scanner assembly which can secure desired optical path lengths and achieve the miniaturization of the optical scanner assembly as well.

As technical means to achieve the foregoing object, this invention provides an optical path structure of an optical scanner assembly for introducing three or more light beams to deflector means for deflection and passing the respective light beams deflected and reflected by the deflector means through an Fθ lens to scan over image carriers individually, thereby forming electrostatic latent images on the image carriers, the optical path structure introducing the light beams from light sources to the image carriers. In plan view, a pair of Fθ lenses are arranged at symmetrical positions about an axis of symmetry passing through the center of the deflector means. Three or more light sources for emitting the light beams are divided into two groups and arranged across the axis of symmetry. At least one of the light beams is incident on reflector means arranged on the other side of the axis of symmetry from the light source of the light beam. The rest of the light beams is/are incident on other reflector means arranged on the same side of the axis of symmetry as the light source(s) of the light beam(s). The light beams reflected from the reflector means are reflected by deflector reflective surfaces of the deflector means lying on the same sides of the axis of symmetry as the reflector means, and introduced to the Fθ lenses, respectively.

The light source to emit the one light beam that is incident on the reflector means on the other side of the axis of symmetry is arranged close to a base line which passes through the center of the deflector means and crosses the axis of symmetry at right angles. The light sources of the other two light beams are arranged farther from the base line. That is, the one light beam is introduced to a deflector reflective surface of the deflector means on the farther side. The other two light beams are introduced to deflector reflective surfaces of the deflector means on the closer sides. Therefore, the optical path length of the one light beam and the optical path lengths of the two light beams can be easily adjusted to the same length.

In addition, the light source of the one light beam can be arranged with no wide space from the axis of symmetry. As a result, the optical path of that light beam up to the deflector means can be accommodated in a small region, which allows the miniaturization of the optical scanner assembly.

The optical path structure of an optical scanner assembly according to this invention is characterized in that the optical paths of light beams passed through the same Fθ lens out of the pair of Fθ lenses generally agree with each other where extending from the reflector means to the deflector reflective surface. Alternatively, the optical path structure of an optical scanner assembly according to the invention is characterized in that the optical path of a light beam reflected from the reflector means lying on the same side of the axis of symmetry as the light source thereof is arranged above that of a light beam reflected from the reflector means lying on the other side of the axis of symmetry from the light source thereof so that these optical paths generally agree with each other.

The general agreement of the optical paths facilitates the mounting and adjustment of such optical members as the reflector means. In addition, machining precision can be easily secured of the mounting portions of these optical members.

Another optical path structure of an optical scanner assembly according to this invention is an optical path structure of an optical scanner assembly for introducing three or more light beams to deflector means for deflection and passing the respective light beams deflected and reflected by the deflector means through an Fθ lens to scan over image carriers individually, thereby forming electrostatic latent images on the image carriers, the optical path structure introducing the light beams from light sources to the image carriers. In plan view, a pair of Fθ lenses are arranged at symmetrical positions about an axis of symmetry passing through the center of the deflector means. Three or more light sources for emitting the light beams are divided into two groups and arranged across the axis of symmetry. Reflector means for reflecting the respective light beams are arranged across the axis of symmetry. The light beam emitted from a light source on one side of the axis of symmetry is incident on the reflector means on the other side. The light beams reflected from the reflector means are reflected by deflector reflective surfaces of the deflector means lying on the same sides of the axis of symmetry as the reflector means, and introduced to the Fθ lenses, respectively.

The light beams are all introduced so as to be incident on the deflector reflective surfaces that lie on the other sides of the axis of symmetry from their respective light sources. That is, the light beams are incident on the deflector reflective surfaces farther from their light sources. Therefore, the optical path lengths up to the deflector reflective surfaces can be increased, whereby desired lengths can be secured easily. The optical paths can be accommodated in small regions. Besides, the optical path lengths of all the light beams can be easily made equal.

The optical path structure of an optical scanner assembly according to this invention is characterized in that optical paths extending from the light sources to the reflector means are generally orthogonal to the axis of symmetry. Alternatively, the optical path structure of an optical scanner assembly according to the invention is characterized in that optical paths extending from the light sources to the reflector means are not orthogonal to the axis of symmetry.

Whether to arrange the optical paths orthogonal or oblique to the axis of symmetry may be determined depending on such factors as the arrangement and structure of the individual parts of this optical scanner assembly. The oblique arrangement can secure greater optical path lengths than in the case of the orthogonal arrangement, thereby allowing easy adjustment for equal optical path lengths. In the orthogonal arrangement, on the other hand, the optical paths are oriented along the X- and Y-axes, or the bases for mounting and adjusting the individual parts of this optical scanner assembly. The clearer bases of measurement as to the optical paths facilitate the verification of the mounting precision and the like.

The optical path structure of an optical scanner assembly according to this invention is characterized in that the light sources and the reflector means are arranged at symmetrical positions about the axis of symmetry.

When the optical paths are oblique to the axis of symmetry, the optical paths can be prevented from overlapping. This allows symmetric arrangement of the light sources and the reflector means. Cylindrical lenses and the like which carry out an adjustment to the light beams can also be arranged symmetrically. When the optical members are arranged symmetrically, parts deformations resulting from the influence of temperature and the like equally act on the parts lying in symmetrical positions. This can make the optical members less susceptible to the influence.

Another optical path structure of an optical scanner assembly according to this invention is an optical path structure of an optical scanner assembly for introducing four light beams to deflector means for deflection and passing the respective light beams deflected and reflected by the deflector means through an Fθ lens to scan over image carriers individually, thereby forming electrostatic latent images on the image carriers, the optical path structure introducing the light beams from light sources to the image carriers. In plan view, a pair of Fθ lenses are arranged at symmetrical positions about an axis of symmetry passing through the center of the deflector means. Four light sources for emitting the light beams are divided into two pairs and arranged across the axis of symmetry. Reflector means for reflecting the respective light beams are arranged across the axis of symmetry. The light beam emitted from one of the light sources arranged on one side of the axis of symmetry and the light beam emitted from the other light source are incident on the reflector means on the other side and on the same side, respectively. The light beams reflected from the reflector means are reflected by deflector reflective surfaces of the deflector means lying on the same sides of the axis of symmetry as the reflector means, and introduced to the Fθ lenses, respectively.

A color imaging system uses four laser beams for carrying image data of Y, M, C, and BK, respectively. Thus, four light sources are typically in use. The light beams emitted from the light sources arranged closer to the base line are incident on the reflector means that are arranged farther from the base line on the same sides of the axis of symmetry as the light sources are. Meanwhile, the light beams emitted from the light sources arranged farther from the base line are incident on the reflector means that are arranged closer to base line on the other sides of the axis of symmetry from the light sources are. On this account, the optical path lengths of the light beams can be made yet greater. The optical path lengths can be easily made equal.

The above and other objects, features and advantages of the present invention will be apparent from the following detailed description of the preferred embodiments of the invention in conjunction with the accompanying drawings, in which:

DETAILED DESCRIPTION OF THE PREFERRED EMBODIMENTS

Hereinafter, the optical path structure of an optical scanner assembly according to this invention will be described in the concrete in conjunction with shown preferred embodiments.

Figure 1:
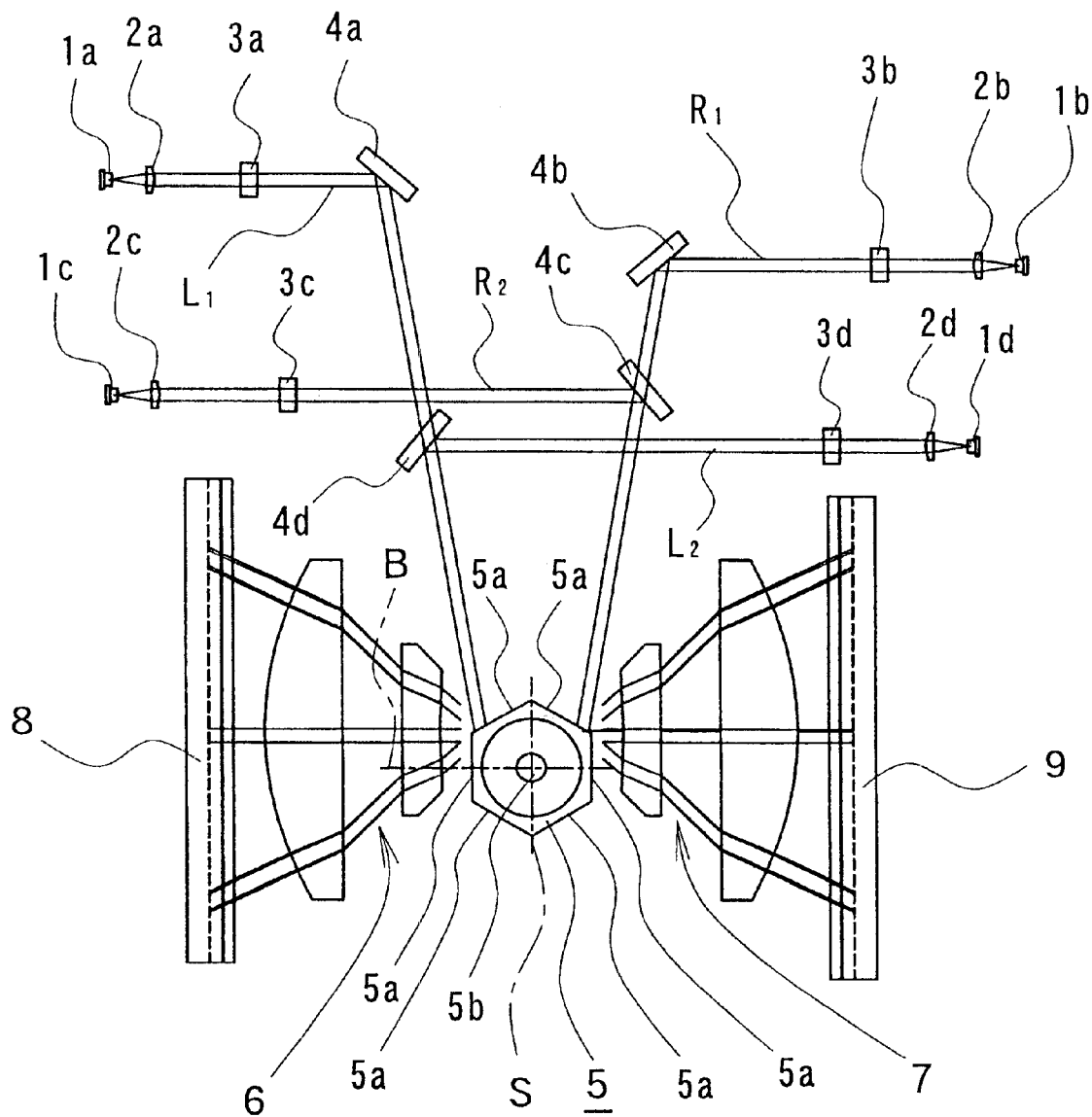
FIG. 1 is a plan view schematically showing a first embodiment of the optical path structure of an optical scanner assembly according to this invention.
Figure 2:
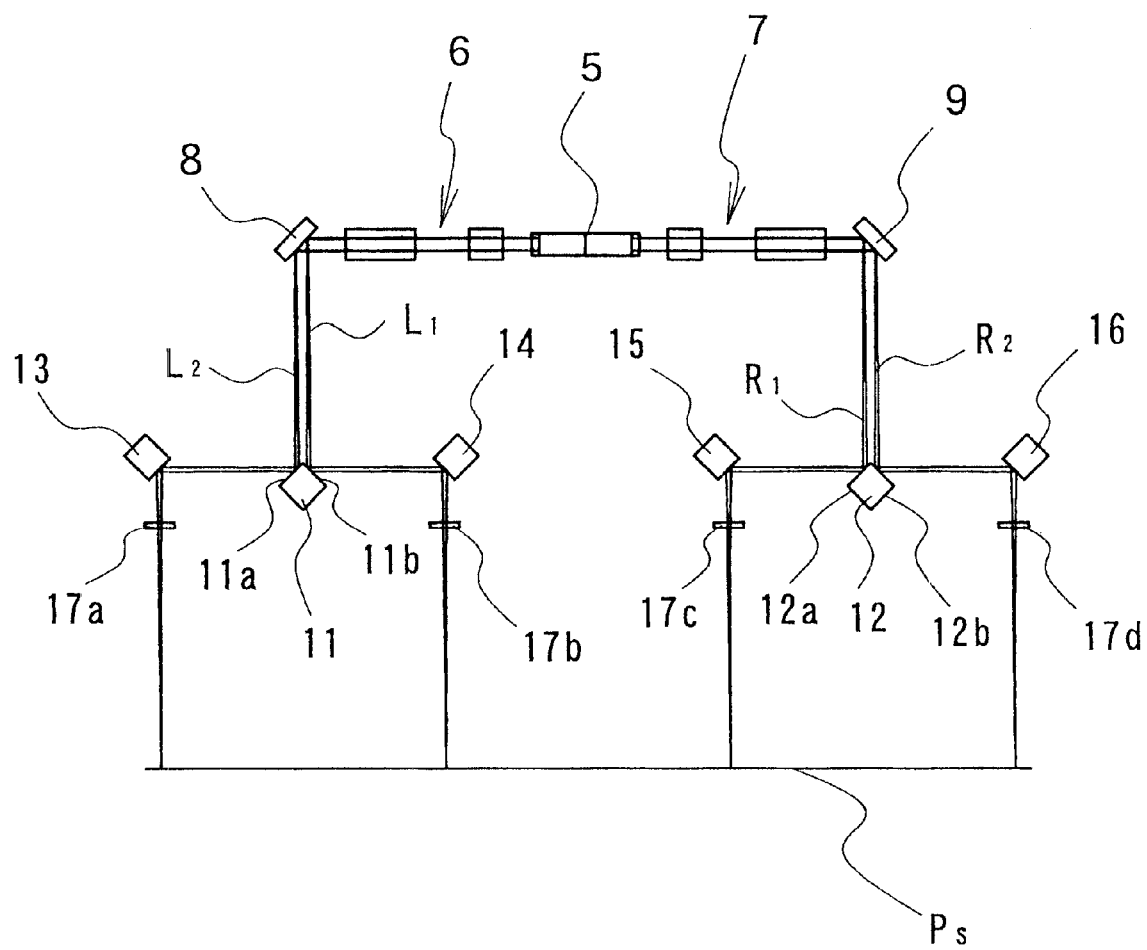
FIG. 2 is a front view of the optical path structure shown in FIG. 1.
Figure 3:
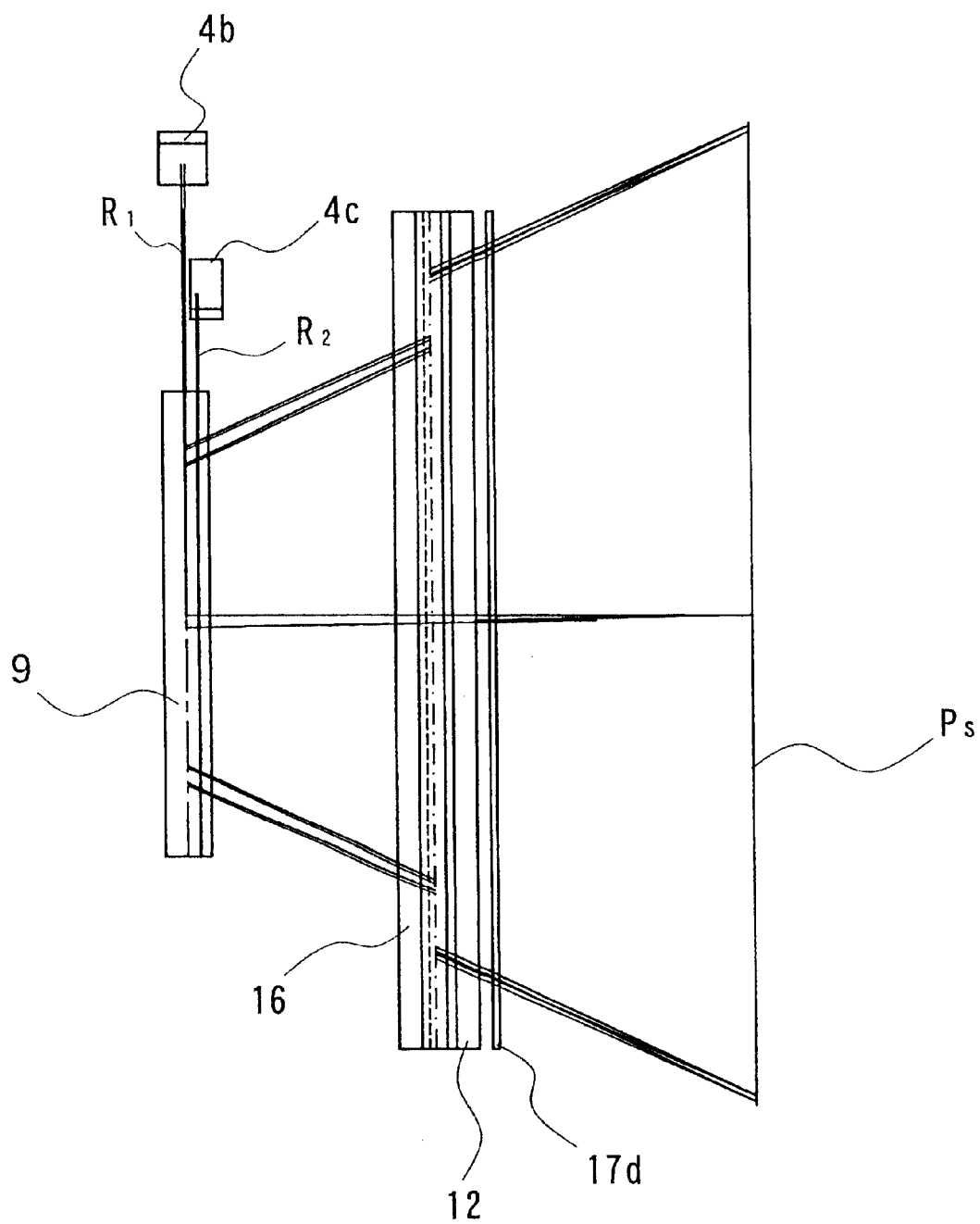
FIG. 3 is a right side view of the optical path structure shown in FIG. 1.

FIGS. 1 to 3 show a first embodiment. These are schematic diagrams showing optical paths of an optical scanner assembly according to this invention. FIG. 1 is a plan view, FIG. 2 a front view, and FIG. 3 a right side view. This optical scanner assembly is suitably mounted on a color imaging system, and has four laser light sources 1a, 1b, 1c, and 1d corresponding to four colors Y, M, C, and BK, respectively. Here, whichever laser light source 1a, 1b, 1c, or 1d may be associated with whichever color Y, M, C, or BK. Collimator lenses 2a, 2b, 2c, and 2d, cylindrical lenses 3a, 3b, 3c, and 3d, and reflectors 4a, 4b, 4c, and 4d are arranged in front of the respective laser light sources 1. The laser beams emitted from the laser light sources 1a, 1b, 1c, and 1d are successively passed through the collimator lenses 2a, 2b, 2c, and 2d, and the cylindrical lenses 3a, 3b, 3c, and 3d, reflected from the reflectors 4a, 4b, 4c, and 4d, and incident on the deflector means, or a polygon mirror 5. This polygon mirror 5 is approximately hexagonal in shape. The six faces thereof make deflector reflective surfaces 5a. The polygon mirror 5 rotates about a spindle 5b at an appropriate speed to change the orientations of the deflector reflective surfaces 5a sequentially, whereby incident light beams are deflected.

With a straight line passing through the spindle 5b of the polygon mirror 5 as an axis of symmetry S, a pair of Fθ lenses 6 and 7 are arranged symmetrically about the axis of symmetry S. These Fθ lenses 6 and 7 are followed by introductory reflectors 8 and 9, which reflect incident light beams downwardly (FIG. 2) in parallel with the spindle 5b of the polygon mirror 5. Splitter reflectors 11 and 12 are arranged in front of the introductory reflectors 8 and 9, respectively. The splitter reflectors 11 and 12 each have two splitter reflective surfaces 11a, 11b, 12a, and 12b. The splitter reflective surfaces are orthogonal to each other and slanted at approximately 45° with respect to the light beams reflected from the introductory reflectors 8 and 9. When a plurality of light beams are reflected from the introductory reflector 8, the splitter reflective surfaces 11a and 11b of the splitter reflector 11 are placed with their border in the middle of these light beams. Thereby, the plurality of incident light beams is appropriately divided between the splitter reflective surfaces 11a and 11b. For example, as shown in FIG. 2, when two light beams $L_1$ and $L_2$ are incident from the introductory reflector 8, the border between the splitter reflective surfaces 11a and 11b is situated between these light beams $L_1$ and $L_2$. The left side (FIG. 2) light beams L1 and L2 are incident on the splitter reflective surfaces 11b and 11a, respectively. When a plurality of light beams are reflected from the introductory reflector 9, the splitter reflective surfaces 12a and 12b of the splitter reflector 12 are placed with their border in the middle of these light beams. The right side (FIG. 2) light beams $R_1$ and $R_2$ are thus incident on the splitter reflective surfaces 12a and 12b, respectively.

Cylindrical mirrors 13, 14, 15, and 16 are arranged in front of the splitter reflectors 11a, 11b, 12a, and 12b, respectively. Then, the light beam $L_2$ is incident on the reflecting surface of the cylindrical mirror 13, the light beam $L_1$ on the reflecting surface of the cylindrical mirror 14, the light beam $R_1$ on the reflecting surface of the cylindrical mirror 15, and the light beam $R_2$ on the reflecting surface of the cylindrical mirror 16.

At the reflecting surfaces of the cylindrical mirrors 13, 14, 15, and 16, the light beams $L_1$, $L_2$, $R_1$, and $R_2$ are reflected in the direction parallel to the spindle 5b of the polygon mirror 5 with appropriate spaces therebetween. Transparency plates 17a, 17b, 17c, and 17d are arranged in front of the respective reflecting surfaces. The light beams $L_1$, $L_2$, $R_1$, and $R_2$ are passed through these transparency plates 17a, 17b, 17c, and 17d. Scanning positions $P_s$ of the image carriers (not shown) such as photosensitive drums lie in front of these transparency plates 17a, 17b, 17c, and 17d.

Next, description will be given of the optical path structure extending from the light sources 1a, 1b, 1c, and 1d to the polygon mirror 5 according to this first embodiment. Assume here that a straight line that passes through the spindle 5b of the polygon mirror 5 and crosses the above-mentioned axis of symmetry S at right angles is a base line B (FIG. 1). In addition, this first embodiment includes the four light sources 1a, 1b, 1c, and 1d which are in pairs. To be more specific, the light source 1a and the light source 1c are in a pair, and the light source 1b and the light source 1d are in another pair. The light sources 1a and 1c are arranged on the same side with respect to the axis of symmetry S. The light sources 1b and 1d are arranged on the side opposite to the light sources 1a and 1d. As shown in FIG. 1, the light sources 1c and 1d are located closer to the base line B than the light sources 1a and 1b are.

With respect to the axis of symmetry S, the reflectors 4a and 4b are arranged on the same sides as the corresponding light sources 1a and 1b. In contrast, the reflectors 4c and 4d are arranged on the other sides of the axis of symmetry S from the corresponding light sources 1c and 1d. Accordingly, the light beam $L_1$ emitted from the light source 1a, reflected by the reflector 4a is incident on a deflector reflective surface 5a that lies on the same side of the axis of symmetry S as the light source 1a. The light beam $R_1$ emitted from the light source 1b, reflected by the reflector 4b is also incident on the deflector reflective surface 5a that lies on the same side of the axis of symmetry S as the light source 1b. Meanwhile, the light beam $R_2$ emitted from the light source 1c, reflected by the reflector 4c is incident on a deflector reflective surface 5a that lies on the other side of the axis of symmetry S from the light source 1c. The light beam $L_2$ emitted from the light source 1d, reflected by the reflector 4d is incident on the deflector reflective surface 5a that lies on the other side of the axis of symmetry S from the light source 1d. That is, as shown in FIG. 1, the optical path of the light beam $R_2$ is arranged across the optical path of the light beam $L_1$ and the axis of symmetry S. The optical path of the light beam $L_2$ is arranged across the light beam $R_1$ and the axis of symmetry S. Incidentally, the deflector reflective surface 5a that the light beams $L_1$ and $L_2$ are incident on and the deflector reflective surface 5a that the light beams $R_1$ and $R_2$ are incident on lie with the axis of symmetry S therebetween.

The optical paths of the light beams $L_1$, $L_2$, $R_1$, and $R_2$ that extend from the light sources 1a, 1b, 1c, and 1d to the reflectors 4a, 4b, 4c, and 4d are all orthogonal to the axis of symmetry S. Therefore, it is undesirable that the optical paths of the light beams $R_2$ and $L_2$ traveling across the axis of symmetry S overlap each other where extending from the light sources 1c and 1d to the reflectors 4c and 4d, respectively. It is also undesirable that the light beams $L_1$ and $L_2$, or the light beams $R_1$ and $R_2$, incident on the deflector reflective surface 5a on the same side overlap each other. For this reason, as shown in FIG. 3, the light beams $R_1$ and $R_2$, as well as the light beams $L_1$ and $L_2$, are put at different levels so that the reflectors 4c and 4d for the light beams $R_2$ and $L_2$ are prevented from falling on the optical paths of the light beams $R_1$ and $L_1$, respectively. In addition, the optical path of the light beam $R_2$ up to the reflector 4c and the optical path of the light beam $L_2$ up to the reflector 4d are given different distances from the base line B as shown in FIG. 1, for the reflectors 4c and 4d are at the same level.

Now, the operation of the optical path structure of an optical scanner assembly according to the first embodiment of this invention configured as above will be described below.

The light beams $L_1$, $L_2$, $R_1$, and $R_2$, each containing information about one of Y, M, C, and BK data of an image to be processed, are emitted from the light sources 1a, 1b, 1c, and 1d. The light beams are adjusted into parallel light beams through the collimator lenses 2a, 2b, 2c, and 2d, and then adjusted into condensed light beams through the cylindrical lenses 3a, 3b, 3c, and 3d. Subsequently, the light beams $L_1$ and $R_1$ are reflected from the reflectors 4a and 4b, respectively, and incident on deflector reflective surfaces 5a of the polygon mirror 5 that lie on the same sides of the axis of symmetry S as the respective light sources 1a and 1b of the light beams $L_1$ and $R_1$. Note that the optical paths of these light beams $L_1$ and $R_1$ are put at approximately the same level. On the other hand, the light beams $L_2$ and $R_2$ cross the light beams $R_1$ and $L_1$, and are reflected from the reflectors 4d and 4c, respectively. The light beams $L_2$ and $R_2$ are incident on deflector reflective surfaces 5a of the polygon mirror 5 that lie on the other sides of the axis of symmetry S from the respective light sources 1c and 1d of the light beams $L_2$ and $R_2$. Here, the optical paths of these light beams $L_2$ and $R_2$ are put at approximately the same level, below the light beams $L_1$ and $R_1$.

The light beams $L_1$, $L_2$, $R_1$, and $R_2$ incident on the deflector reflective surfaces 5a are sequentially deflected by the rotation of the polygon mirror 5. The light beams $L_1$ and $L_2$ are passed through the Fθ lens 6 and reflected at the introductory reflector 8. The light beams $R_1$ and $R_2$ are passed through the Fθ lens 7 and reflected at the introductory reflector 9. After the reflection at the introductory reflector 8, 9, the light beam $L_1$ is reflected from the splitter reflective surface 11b of the splitter reflector 11 and incident on the cylindrical mirror 14. The light beam $L_2$ is reflected from the splitter reflective surface 11a and incident on the cylindrical mirror 13. The light beam $R_1$ is reflected from the splitter reflective surface 12a of the splitter reflector 12 and incident on the cylindrical mirror 15. The light beam $R_2$ is reflected from the splitter reflective surface 12b and incident on the cylindrical mirror 16. The light beams $L_1$, $L_2$, $R_1$, and $R_2$ incident on the cylindrical mirror 13, 14, 15, and 16 are passed through the optical paths parallel to the spindle 5a of the polygon mirror 5 with appropriate spaces therebetween, before incident on the scanning positions $P_s$ of the image carriers corresponding to the respective light beams $L_1$, $L_2$, $R_1$, and $R_2$. As a result, electrostatic latent images based on the corresponding data are formed.

According to the optical path structure of an optical scanner assembly in this first embodiment, the light beams $R_2$ and $L_2$ emitted from the light sources 1c and 1d located closer to the base line are incident on the reflectors 4c and 4d that are arranged on the other sides across the axis of symmetry S. Therefore, greater optical path lengths can be secured than in the case of optical paths where the light beams of the light sources 1c and 1d are incident on reflectors that are arranged on the same sides of the axis of symmetry S as the light sources 1c and 1d are. Consequently, the optical path lengths from the light sources 1c and 1d to the polygon mirror 5 can be made nearly equal to the optical path lengths from the light sources 1a and 1b lying farther from the base line to the polygon mirror 5. Through the adjustment of position of the cylindrical lenses 3a, 3b, 3c, and 3d, any of the light beams $L_1$, $L_2$, $R_1$, and $R_2$ can be easily given equal optical path lengths from the cylindrical lenses 3a, 3b, 3c, and 3d to the deflector reflective surfaces 5a of the polygon mirror 5. Incidentally, the optical path lengths from the deflector reflective surfaces 5a to the scanning positions $P_s$ can be easily made equal for any of the light beams $L_1$, $L_2$, $R_1$, and $R_2$.

If the light beams $R_2$ and $L_2$ from the light sources 1c and 1d were incident on reflectors lying on the same sides of the axis of symmetry S as the light sources 1c and 1d, then the light sources 1c and 1d should be protruded sideways in FIG. 1 for the sake of sufficient optical path lengths, possibly increasing the size of the optical scanner assembly. In contrast, the optical path structure according to this first embodiment is free from such need, which allows the miniaturization of the optical scanner assembly.

In addition, the equal optical path lengths permit commonality of such parts as the cylindrical lenses 3a, 3b, 3c, and 3d, and the reflectors 4. The member cost can be reduced to suppress the cost of the optical scanner assembly.

Moreover, the optical paths of the light beams $L_1$, $L_2$, $R_1$, and $R_2$ are all orthogonal to the axis of symmetry S, extending in directions identical or orthogonal to the direction to be referred to in mounting the optical members on this optical scanner assembly. This facilitates accuracy verification of these optical paths.

Figure 4:
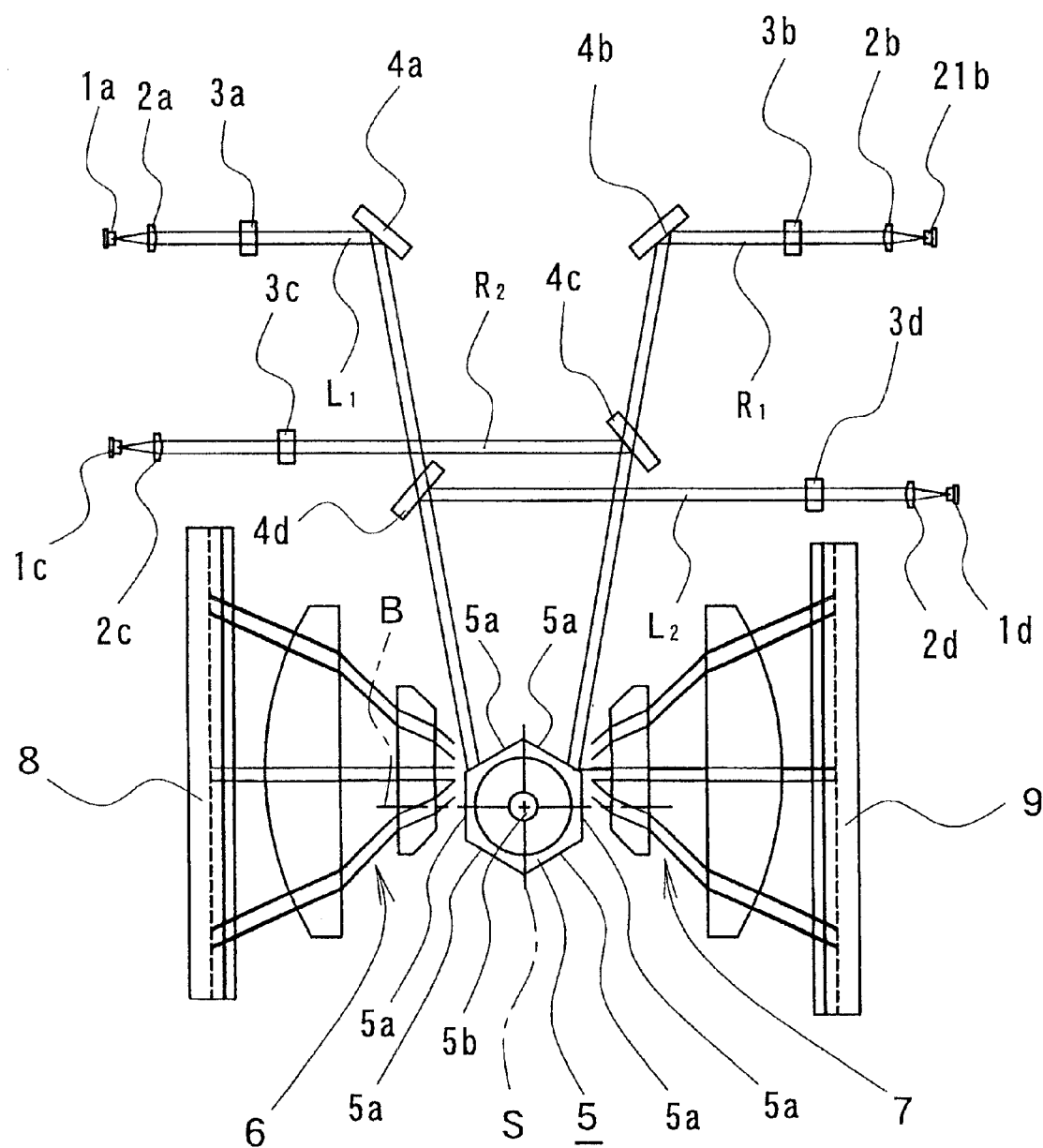
FIG. 4 is a plan view schematically showing a second embodiment of the optical path structure of an optical scanner assembly according to this invention.

Now, description will be given of the optical path structure of an optical scanner assembly according to a second embodiment shown in FIG. 4. In the structure according to this second embodiment, the same parts as those of the structure according to the foregoing first embodiment will be designated by identical reference numerals. The optical paths from the polygon mirror 5 to the scanning positions $P_s$ are the same as in the first embodiment, and thus will be omitted here. In this second embodiment, the light source 1b of the first embodiment, lying farther from the base line B, is replaced with a light source 21b which is located at approximately the same distance as the light source 1a from the base line B. Therefore, the light sources 1a and 21b lie at symmetrical positions about the axis of symmetry S. The collimator lenses 2a and 2b, the cylindrical lenses 3a and 3b, and the reflectors 4a and 4b can also be located at symmetrical positions.

In the optical path structure according to this second embodiment, the light sources 1a and 21b, the collimator lenses 2a and 2b, the cylindrical lenses 3a and 3b, and the reflectors 4a and 4b are in symmetrical positions about the axis of symmetry S. Therefore, even when thermal deformation occurs in such members as the casing of the optical scanner assembly and the base member on which these optical members are mounted, the deformation will act on these optical members equally. This can minimize the influence of the deformation on optical performance if any.

Figure 5:
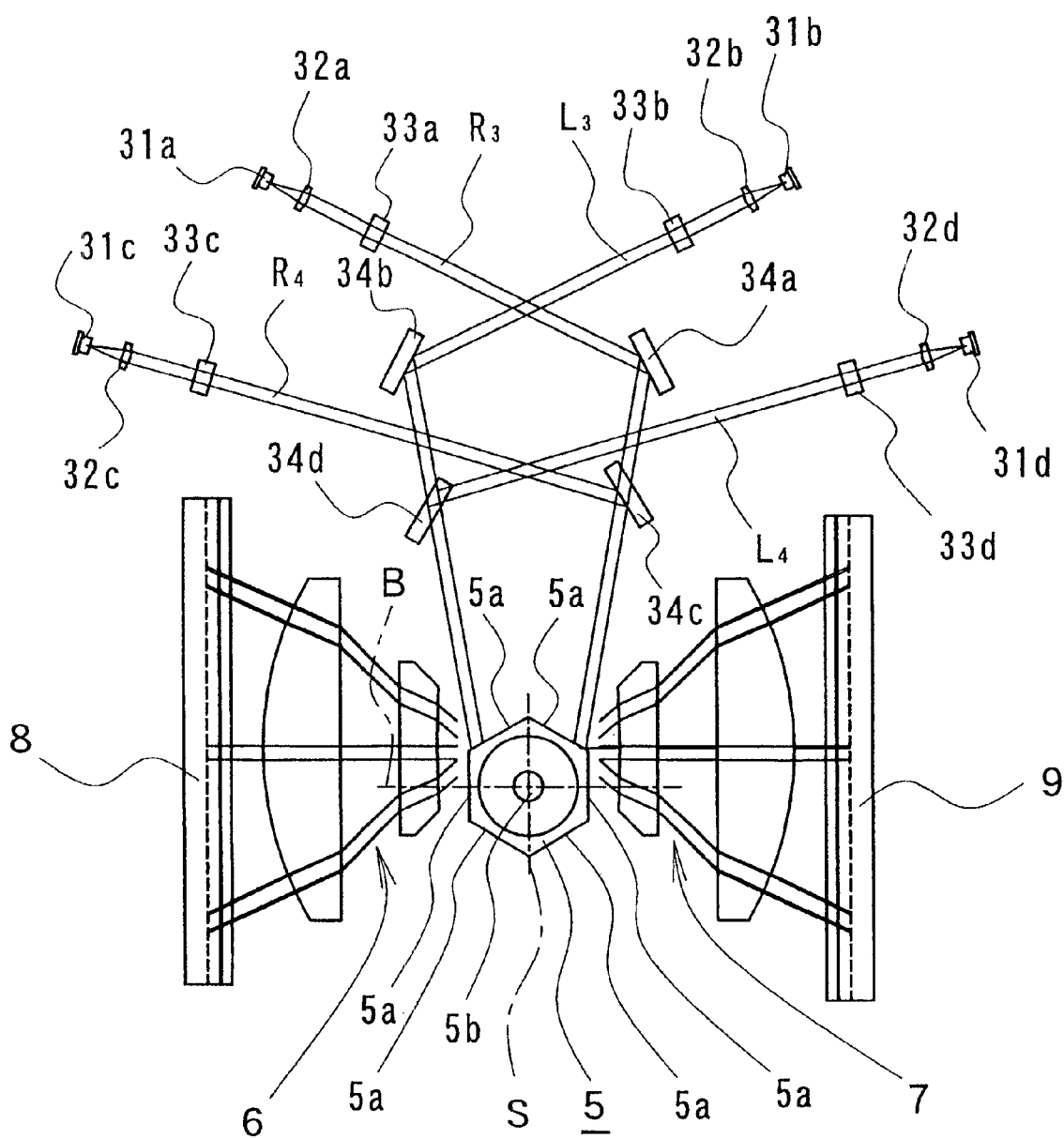
FIG. 5 is a plan view schematically showing a third embodiment of the optical path structure of an optical scanner assembly according to this invention.

Now, description will be given of a third embodiment. FIG. 5 shows a plan view thereof. Here, the same parts as those of the optical path structure according to the first embodiment will be designated by identical reference numerals. This third embodiment includes four light sources 31a, 31b, 31c, and 31d in pairs. In plan view, the light sources 31a and 31b, as well as the light sources 31c and 31d, are arranged at symmetrical positions across the axis of symmetry S. Collimator lenses 32a, 32b and cylindrical lenses 33a, 33b are also arranged symmetrically across the axis of symmetry S. So are collimator lenses 32c, 32d and cylindrical lenses 33c, 33d. With respect to the axis of symmetry S, the collimator lenses 32a, 32b, 32c, and 32d, and the cylindrical lenses 33a, 33b, 33c, and 33d are arranged on the same sides as their respective light sources 31a, 31b, 31c, and 31d are.

A light beam $R_3$ emitted from the light source 31a is passed through the collimator lens 32a and the cylindrical lens 33a, and incident on a reflector 34a. A light beam $L_3$ emitted from the light source 31b is passed through the collimator lens 32b and the cylindrical lens 33b, and incident on a reflector 34b. A light beam $R_4$ emitted from the light source 31c is passed through the collimator lens 32c and the cylindrical lens 33b, and incident on a reflector 34c. A light beam $L_4$ emitted from the light source 31d is passed through the collimator lens 32d and the cylindrical lens 33d, and incident on a reflector 34d. These reflectors 34a, 34b, 34c, and 34d are arranged on the opposite sides of the axis of symmetry S from their corresponding light sources 31a, 31b, 31c, and 31d. The light beams $L_3$, $L_4$, $R_3$, and $R_4$ reflected from these reflectors 34a, 34b, 34c, and 34d are incident on deflecting reflection surfaces 5a of the polygon mirror 5 and passed through the Fθ lenses 6 and 7 while sequentially deflected in the directions of reflection.

Figure 6:
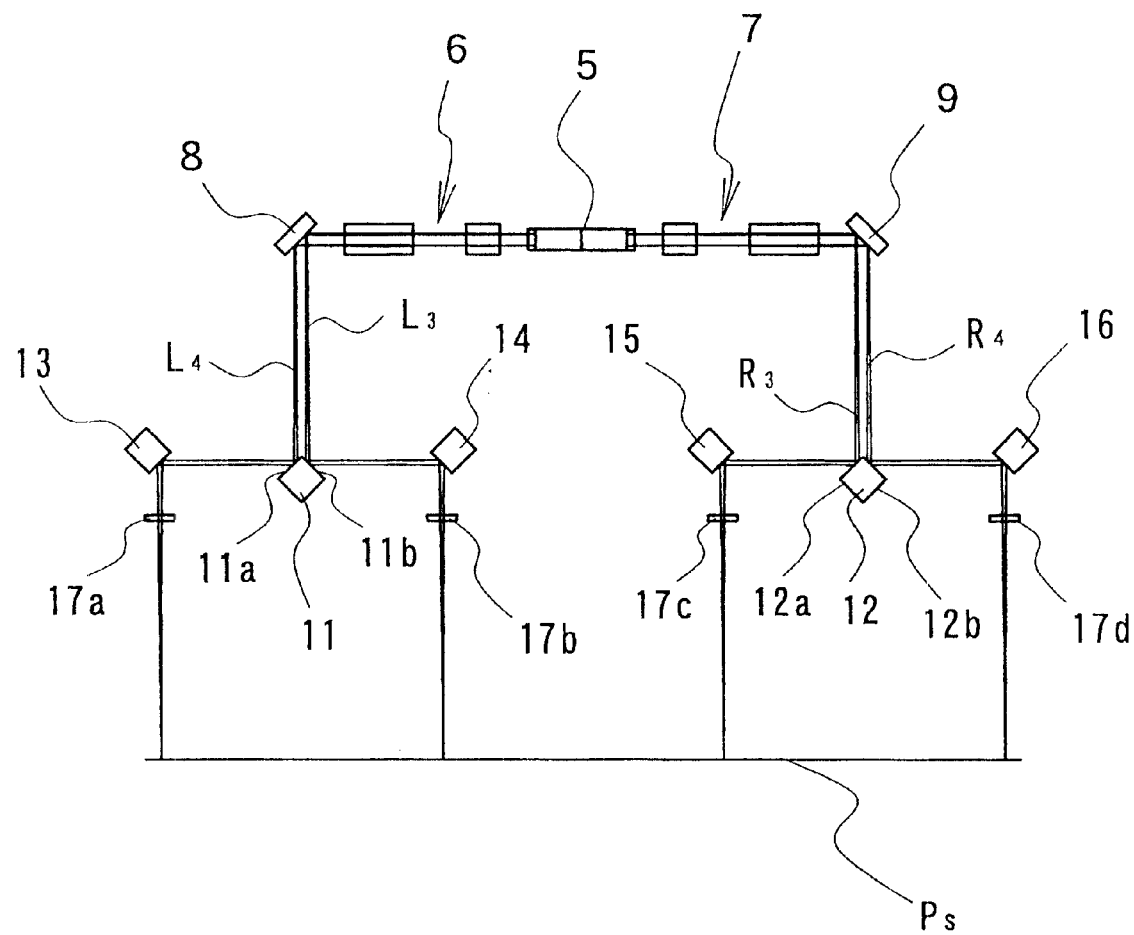
FIG. 6 is a front view of the optical path structure shown in FIG. 5.

The optical paths of the light beams $L_3$, $L_4$, $R_3$, and $R_4$ extending from the light sources 31a, 31b, 31c, and 31d to the reflectors 34a, 34b, 34c, and 34d are all slanted at appropriate angles from a direction orthogonal to the axis of symmetry S so that the light beams $L_3$, $L_4$, $R_3$, and $R_4$ approach the polygon mirror 5 as they travel. As a result, all the optical paths of the light beams $L_3$, $L_4$, $R_3$, and $R_4$ cross the axis of symmetry S obliquely. As shown in FIG. 6, the optical paths of the light beams $L_3$ and $L_4$ are put at different levels. The optical paths of the light beams $R_3$ and $R_4$ are put at different levels.

In the optical path structure according to this third embodiment, any of the light sources 31a, 31b, 31c, and 31d, the collimator lenses 32a, 32b, 32c, and 32d, the cylindrical lenses 33a, 33b, 33c, and 33d, and the reflectors 34a, 34b, 34c, and 34d can be arranged in symmetrical positions about the axis of symmetry S in plan view. Therefore, it is possible to minimize the influence of thermal or other deformation if any. Besides, the light beams $L_3$, $L_4$, $R_3$, and $R_4$ emitted from the light sources 31a, 31b, 31c, and 31d are incident on the deflector reflective surfaces 5a at the opposite sides of the axis of symmetry S from their respective light sources 31a, 31b, 31c, and 31d. Accordingly, optical path lengths from the light sources 31a, 31b, 31c, and 31d to the polygon mirror 5 can be made greater. This allows easy adjustment for equalizing the optical path lengths from the cylindrical lenses 33a, 33b, 33c, and 33d to the scanning positions $P_s$.

Figure 7:
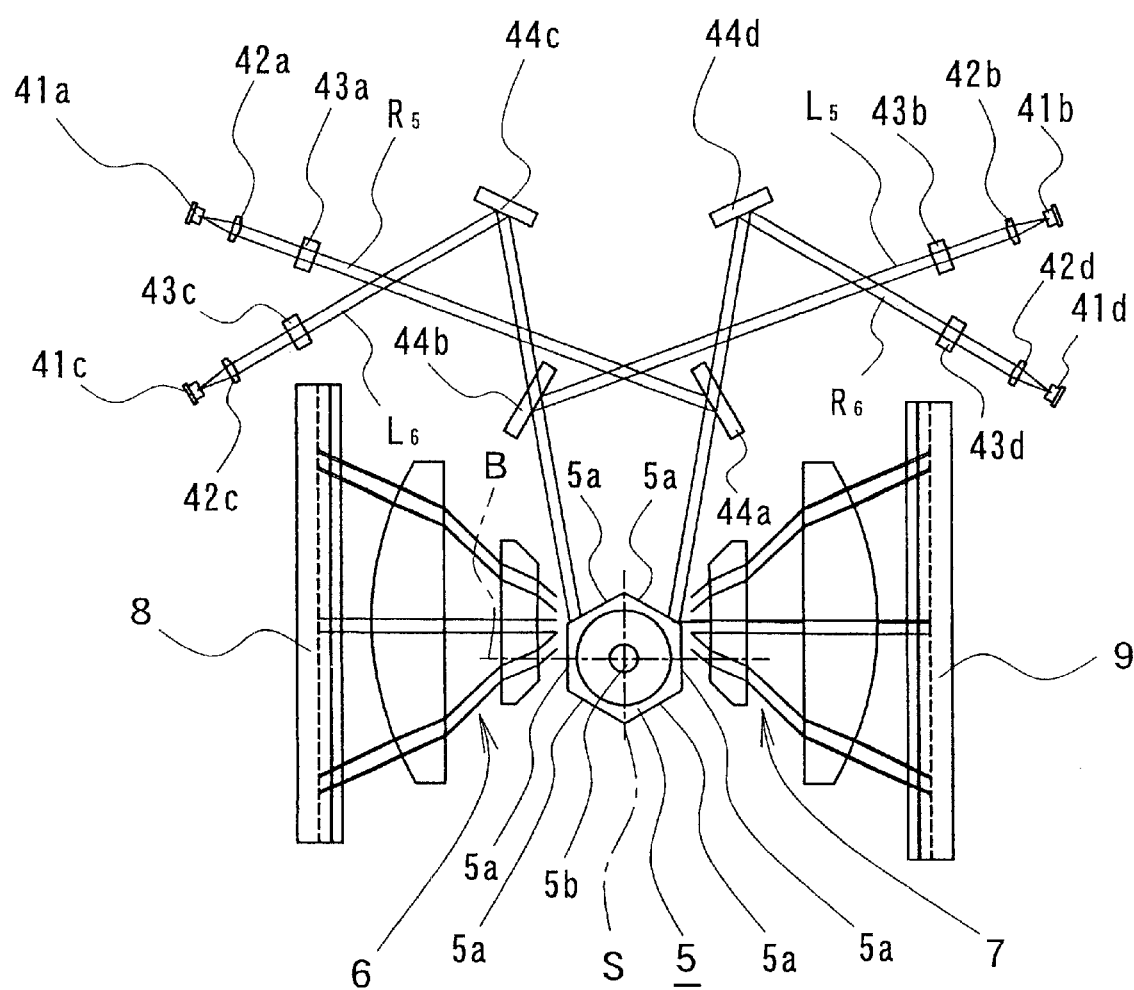
FIG. 7 is a plan view schematically showing a fourth embodiment of the optical path structure of an optical scanner assembly according to this invention.

Now, description will be given of an optical path structure according to a fourth embodiment. FIG. 7 shows a plan view thereof. Here, the same parts as those of the optical path structure according to the first embodiment will be designated by identical reference numerals. This fourth embodiment includes four light sources 41a, 41b, 41c, and 41d in pairs. In plan view, the light sources 41a and 41b, as well as the light sources 41c and 41d, are arranged at symmetrical positions across the axis of symmetry S. Collimator lenses 42a, 42b and cylindrical lenses 43a, 43b are also arranged symmetrically across the axis of symmetry S. So are collimator lenses 42c, 42d and cylindrical lenses 43c, 43d. With respect to the axis of symmetry S, the collimator lenses 42a, 42b, 42c, and 42d, and the cylindrical lenses 43a, 43b, 43c, and 43d are arranged on the same sides as their respective light sources 41a, 41b, 41c, and 41d are.

A light beam $R_5$ emitted from the light source 41a is passed through the collimator lens 42a and the cylindrical lens 43a, and incident on a reflector 44a which is arranged on the other side of the axis of symmetry S from the light source 41a. A light beam $L_5$ emitted from the light source 41b is passed through the collimator lens 42b and the cylindrical lens 43b, and incident on a reflector 44b which is arranged on the other side of the axis of symmetry S from the light source 41b. The optical paths of the light beams $R_5$ and $L_5$ extending from the light sources 41a and 41b to the reflectors 44a and 44b, respectively, are slanted at appropriate angles from a direction orthogonal to the axis of symmetry S so that these light beams $R_5$ and $L_5$ approach the polygon mirror 5 as they travel. As a result, the optical paths of the light beams $R_5$ and $L_5$ cross the axis of symmetry S obliquely.

A light beam $L_6$ emitted from the light source 41c is passed through the collimator lens 42c and the cylindrical lens 43c, and incident on a reflector 44c which is arranged on the same side of the axis of symmetry S as the light source 41c. A light beam $R_6$ emitted from the light source 41d is passed through the collimator lens 42d and the cylindrical lens 43d, and incident on a reflector 44d which is arranged on the same side of the axis of symmetry S as the light source 41d. The optical paths of the light beams $L_6$ and $R_6$ extending from the light sources 41c and 41d to the reflectors 44c and 44d, respectively, are slanted at appropriate angles from the direction orthogonal to the axis of symmetry S so that these light beams $L_6$ and $R_6$ get away from the polygon mirror 5 as they travel. Consequently, the optical paths of the light beams $L_6$ and $R_6$ are oblique to the axis of symmetry S.

Figure 8:
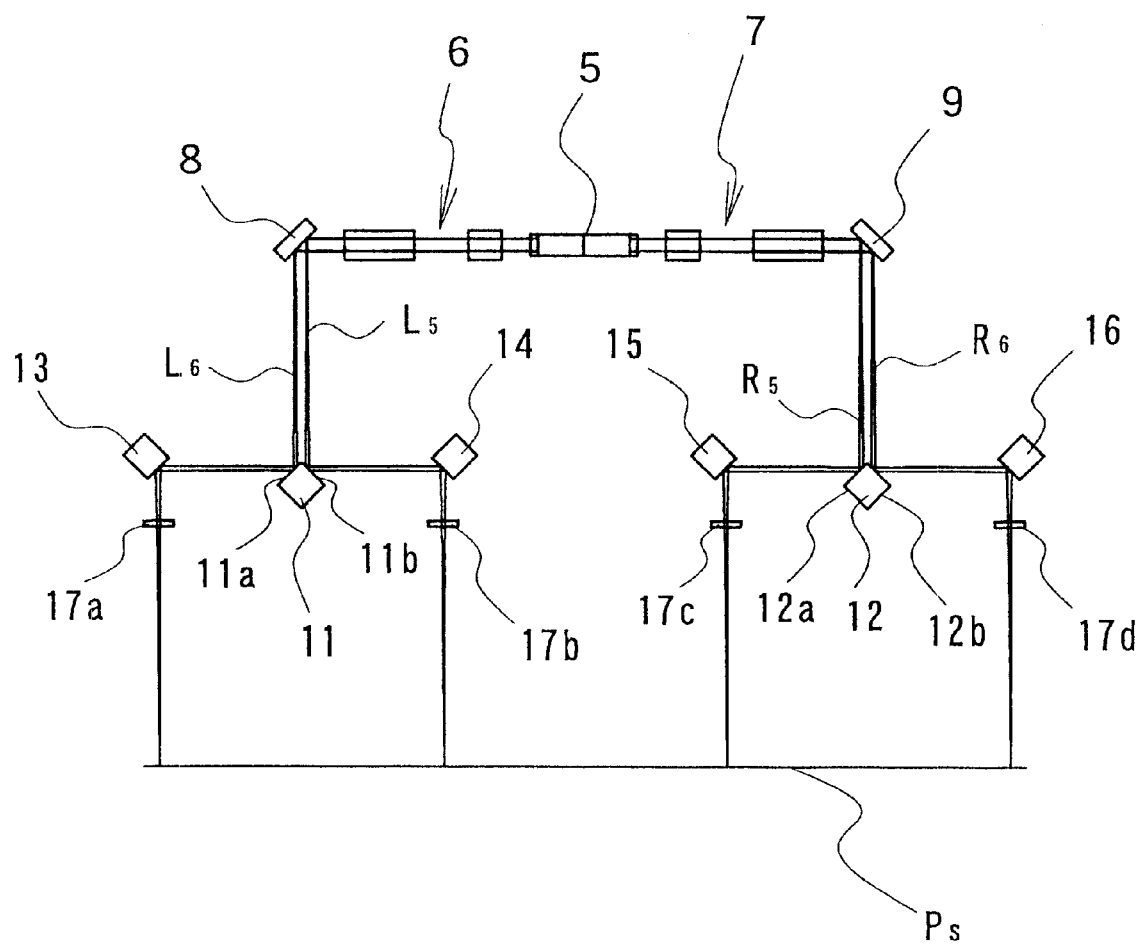
FIG. 8 is a front view of the optical path structure shown in FIG. 7.

The light beams $L_5$, $L_6$, $R_5$, and $R_6$ reflected from the reflectors are incident on deflecting reflection surfaces 5a of the polygon mirror 5 and passed through the Fθ lenses 6 and 7 while sequentially deflected in the directions of reflection. As shown in FIG. 8, the optical paths of the light beams $L_5$ and $L_6$ are put at different levels. The optical paths of the light beams $R_5$ and $R_6$ are put at different levels.

In the optical path structure according to this fourth embodiment, the optical paths of the light beams $L_6$ and $R_6$ emitted from the light sources 41c and 41d closer to the polygon mirror 5 are formed to get away from the polygon mirror 5 where extending from the light sources 41c and 41d to the reflectors 44c and 44d. Therefore, the optical path lengths of the light beams $L_6$ and $R_6$ can be increased to secure approximately the same optical path lengths as those of the light beams $L_5$ and $R_5$ which are emitted from the light sources 41a and 41b farther from the polygon mirror 5. On this account, the optical path lengths from the cylindrical lenses 43a, 43b, 43c, and 43d to the scanning positions $P_s$ can be easily made equal for all the light beams $L_5$, $L_6$, $R_5$, and $R_6$. Furthermore, the optical paths from the light sources 41a, 41b, 41c, and 41d to the reflectors 44a, 44b, 44c, and 44d are put oblique to the axis of symmetry S. Thus, the light sources 41a, 41b, 41c, and 41d, the collimator lenses 42a, 42b, 42c, and 42d, the cylindrical lenses 43a, 43b, 43c, and 43d, the reflectors 44a, 44b, 44c, and 44d, and others can be arranged symmetrically about the axis of symmetry S, with minimum influence of thermal deformation and the like.

While each of the above-described embodiments has illustrated an optical path structure having four light sources, the number of light sources may be three, five, or more. For example, when two light sources are provided for each of Y, M, C, and BK, the transfer on a transfer medium can be performed in two lines at a time with higher transfer speed. In this case, eight light sources are required.

As has been described, according to the optical path structure of an optical scanner assembly of this invention, light beams emitted from light sources are incident on the reflectors that are arranged on the sides opposite to the light sources with respect to the axis of symmetry of a pair of Fθ lenses lying in symmetric positions. Therefore, the optical path lengths from the light sources to the reflectors can be made greater. Consequently, all the light sources can be given nearly equal, greater optical path lengths irrespective of the distances from the deflector means to the locations of the light sources. This allows easy adjustment for equalizing required optical path lengths, such as the optical path lengths from the cylindrical lenses to the scanning positions. Besides, the equalized optical path lengths allow commonality of such parts as the light sources and cylindrical lenses in all the optical paths, with a reduction in member cost. In addition, since the light sources are arranged closer to the deflector means, the optical scanner assembly can be also reduced in size.

In the configuration that the optical paths of light beams passed through the same Fθ lens out of the pair of Fθ lenses generally agree with each other where extending from the reflector means to the deflector reflective surface, or in the configuration that the optical path of a light beam reflected from the reflector means lying on the same side of the axis of symmetry as the light source thereof is arranged above that of a light beam reflected from the reflector means lying on the other side of the axis of symmetry from the light source thereof so that these optical paths generally agree with each other, or equivalently, in the case where some of the optical paths generally agree with each other, such optical members as the reflector means can be mounted and adjusted easily. In addition, machining precision can be easily secure of the mounting portions of these optical members. Furthermore, the optical members require less space for arrangement, allowing the miniaturization of the optical scanner assembly.

In the plan view of the optical path structure of an optical scanner assembly for introducing three or more light beams to deflector means for deflection and passing the respective light beams deflected and reflected by the deflector means through an Fθ lens to scan over image carriers individually, thereby forming electrostatic latent images on the image carriers, the optical path structure introducing the light beams from light sources to the image carriers: a pair of Fθ lenses are arranged at symmetrical positions about an axis of symmetry passing through the center of the deflector means; three or more light sources for emitting the light beams are divided into two groups and arranged across the axis of symmetry; and reflector means for reflecting the respective light beams are arranged across the axis of symmetry. Here, the light beam emitted from a light source on one side of the axis of symmetry is incident on the reflector means on the other side. The light beams reflected from the reflector means are reflected by deflector reflective surfaces of the deflector means lying on the same sides of the axis of symmetry as the reflector means, and introduced to the Fθ lenses, respectively. Since all the optical paths of the light beams are laid across the axis of symmetry, the optical scanner assembly can be made yet smaller.

When the optical paths extending from the light sources to the reflector means are generally orthogonal to the axis of symmetry, or when the optical paths from the light sources to the reflector means are not orthogonal to the axis of symmetry, i.e., the optical paths are oblique to the axis of symmetry, it is possible to arrange the optical members at symmetrical positions as seen in plan view. Therefore, even if thermal deformation occurs in such members as the casing of the optical scanner assembly and the base member on which these optical members are mounted, the deformation will act on these optical members equally. This can minimize the influence of the deformation on optical performance if any.

Since the light sources and the reflector means are arranged at symmetrical positions about the axis of symmetry, the optical members are located symmetrically about the axis of symmetry. This can minimize the influence of thermal or other deformation on optical performance if any.

In the plan view of the optical path structure of an optical scanner assembly for introducing four light beams to deflector means for deflection and passing the respective light beams deflected and reflected by the deflector means through an Fθ lens to scan over image carriers individually, thereby forming electrostatic latent images on the image carriers, the optical path structure introducing the light beams from light sources to the image carriers: a pair of Fθ lenses are arranged at symmetrical positions about an axis of symmetry passing through the center of the deflector means; four light sources for emitting the light beams are divided into two pairs and arranged across the axis of symmetry; and reflector means for reflecting the respective light beams are arranged across the axis of symmetry. Here, the light beam emitted from one of the light sources arranged on one side of the axis of symmetry and the light beam emitted from the other light source are incident on the reflector means on the other side and on the same side, respectively. The light beams reflected from the reflector means are reflected by deflector reflective surfaces of the deflector means lying on the same sides of the axis of symmetry as the reflector means, and introduced to the Fθ lenses, respectively. Therefore, the optical paths of the light beams emitted from the light sources located closer to the deflector means can be made longer. Consequently, the lengths of these optical paths can be made nearly equal to those of the optical paths of the light beams emitted from the light sources that are arranged farther from the deflector means. This allows easy adjustment for equalizing the lengths of the optical paths from the cylindrical lenses to the scanning positions for all the light sources.

While there has been described what are at present considered to be preferred embodiments of the invention, it will be understood that various modifications may be made thereto, and it is intended that the appended claims cover all such modification as fall within the true spirit and scope of the invention.

What is claimed is:

1. An optical path structure of an optical scanner assembly for introducing three or more light beams to deflector means for deflection and passing the respective light beams deflected and reflected by said deflector means through an Fθ lens to scan over image carriers individually, thereby forming electrostatic latent images on said image carriers, the optical path structure introducing the light beams from light sources to said image carriers, the optical path structure comprising:

a pair of Fθ lenses arranged at symmetrical positions about an axis of symmetry passing through the center of a deflector;

at least three light sources for emitting the light beams, divided into two groups arranged across the axis of symmetry;

reflectors on which a first of the light beams is incident, arranged on the other side of the axis of symmetry from a first light source providing the first light beam; and other reflectors on which the remaining light beams are incident, arranged on the same side of the axis of symmetry as the light sources providing the remaining associated light beams, wherein the light beams reflected from said reflectors are reflected by deflector reflective surfaces of said deflector means lying on the same sides of the axis of symmetry as said reflectors, and introduced to said Fθ lenses, respectively.

2. The optical path structure of an optical scanner assembly according to claim 1, wherein the optical paths of light beams passed through the same Fθ lens out of said pair of Fθ lenses generally agree with each other where extending from said reflector to said deflector reflective surface.

3. The optical path structure of an optical scanner assembly according to claim 2, wherein the optical path of a light beam reflected from said reflector lying on the same side of the axis of symmetry as said light source thereof is arranged above that of a light beam reflected from said first reflector lying on the other side of the axis of symmetry from said first light source thereof so that these optical paths generally agree with each other.

4. The optical path structure of an optical scanner assembly according to claim 1, wherein the optical path of a light beam reflected from said reflector lying on the same side of the axis of symmetry as said light source thereof is arranged above that of a light beam reflected from said first reflector lying on the other side of the axis of symmetry from said first light source thereof so that these optical paths generally agree with each other.

5. The optical path structure of an optical scanner assembly according to claim 1, wherein optical paths extending from said light sources to said reflector means are generally orthogonal to the axis of symmetry.

6. The optical path structure of an optical scanner assembly according to claim 2, wherein optical paths extending from said light sources to said reflector means are generally orthogonal to the axis of symmetry.

7. The optical path structure of an optical scanner assembly according to claim 3, wherein optical paths extending from said light sources to said reflector means are generally orthogonal to the axis of symmetry.

8. The optical path structure of an optical scanner assembly according to claim 4, wherein optical paths extending from said light sources to said reflector means are generally orthogonal to the axis of symmetry.

9. The optical path structure of an optical scanner assembly according to claim 1, wherein optical paths extending from said light sources to said reflector means are not orthogonal to the axis of symmetry.

10. The optical path structure of an optical scanner assembly according to claim 2, wherein optical paths extending from said light sources to said reflector means are not orthogonal to the axis of symmetry.

11. The optical path structure of an optical scanner assembly according to claim 3, wherein optical paths extending from said light sources to said reflector means are not orthogonal to the axis of symmetry.

12. The optical path structure of an optical scanner assembly according to claim 4, wherein optical paths extending from said light sources to said reflector means are not orthogonal to the axis of symmetry.

13. An optical path structure of an optical scanner assembly for introducing three or more light beams to deflector means for deflection and passing the respective light beams deflected and reflected by said deflector means through an Fθ lens to scan over image carriers individually, thereby forming electrostatic latent images on said image carriers, the optical path structure introducing the light beams from light sources to said image carriers, the optical path structure comprising, in plan view:

a pair of Fθ lenses arranged at symmetrical positions about an axis of symmetry passing through the center of said deflector means;

three or more light sources for emitting the light beams, divided into two groups and arranged across the axis of symmetry; and reflector means for reflecting the respective light beams, arranged across the axis of symmetry, wherein the light beam emitted from a light source on one side of the axis of symmetry is incident on said reflector means on the other side, and the light beams reflected from said reflector means are reflected by deflector reflective surfaces of said deflector means lying on the same sides of the axis of symmetry as said reflector means, and introduced to said Fθ lenses, respectively.

14. The optical path structure of an optical scanner assembly according to claim 13, wherein said light sources and said reflector means are arranged at symmetrical positions about the axis of symmetry.

15. An optical path structure of an optical scanner assembly for introducing four light beams to deflector means for deflection and passing the respective light beams deflected and reflected by said deflector means through an Fθ lens to scan over image carriers individually, thereby forming electrostatic latent images on said image carriers, the optical path structure introducing the light beams from light sources to said image carriers, the optical path structure comprising, in plan view:

a pair of Fθ lenses arranged at symmetrical positions about an axis of symmetry passing through the center of said deflector means;

four light sources for emitting the light beams, divided into two pairs and arranged across the axis of symmetry; and reflector means for reflecting the respective light beams, arranged across the axis of symmetry, wherein the light beam emitted from one of said light sources arranged on one side of the axis of symmetry and the light beam emitted from the other light source are incident on said reflector means on the other side and on the same side, respectively, and the light beams reflected from said reflector means are reflected by deflector reflective surfaces of said deflector means lying on the same sides of the axis of symmetry as said reflector means, and introduced to said Fθ lenses, respectively.

* * * * *